Patented Feb. 7, 1939

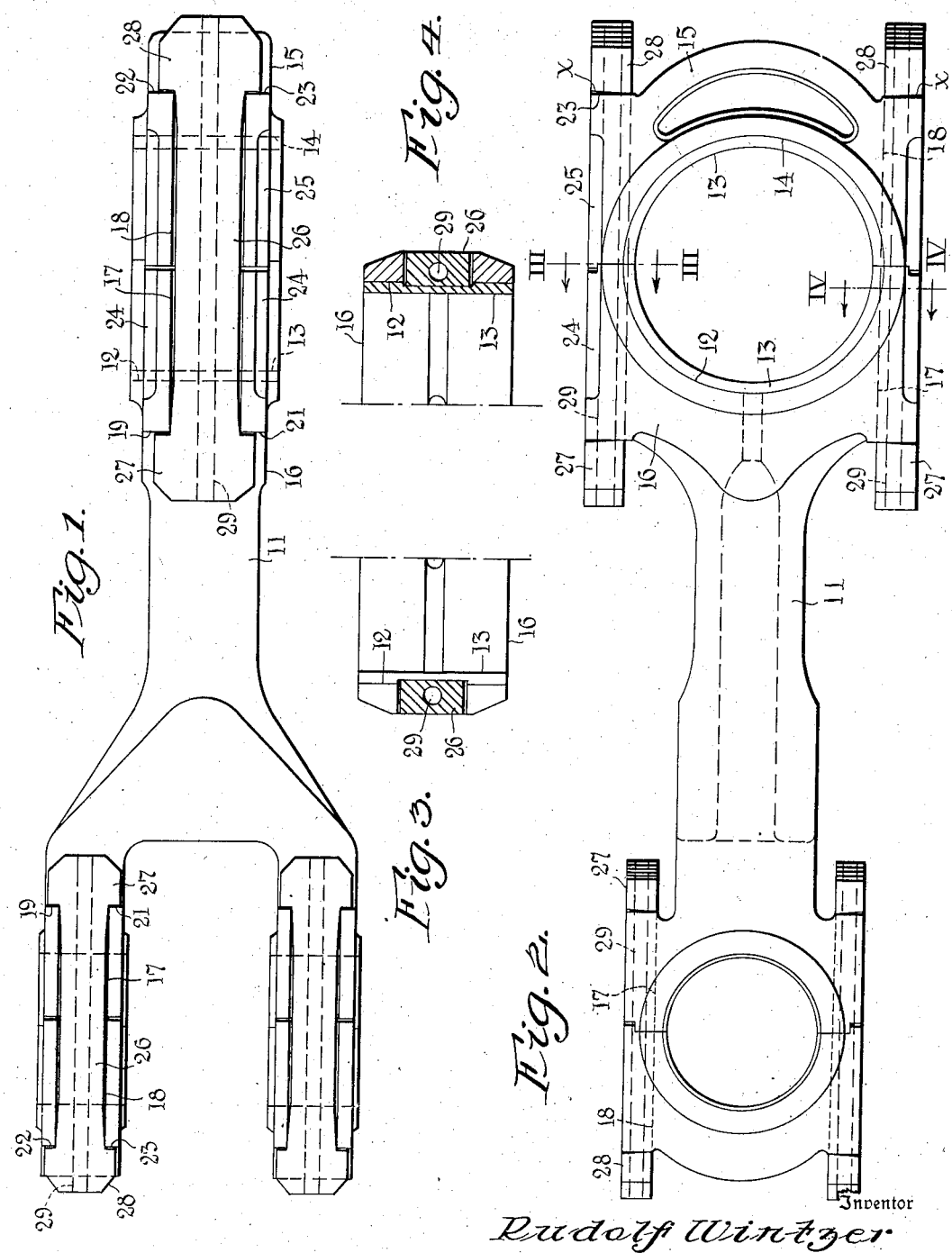

2,146,493

UNITED STATES PATENT OFFICE 2,146,493

CONNECTING ROD AND THE LIKE

Rudolf Wintzer, Milwaukee, Wis., assignor to Nordberg Manufacturing Company, Milwaukee, Wis., a corporation of Wisconsin Application November 25, 1936, Serial No. 112,771

2 Claims. (Cl. 308—37)

This invention relates to connecting rods for engines.

Modern engines, particularly of that type employing welded frame structures, usually afford but slight clearance for the manipulation of wrenches or the like for tightening or removing the bearing elements when said elements are secured in place by cap nuts or through bolts.

The main object of the present invention is to provide connecting members between the removable bearing element and the body of the rod which may be temporarily elongated by heating the same to permit the assembly of the parts, and which, upon subsequent shrinking, will draw the various elements firmly together, and this without the necessity of tightening up any bolts or the like. So, too, the connecting members may be readily removed, this being effected by heating and consequently elongating the same, whereupon the interengaging faces between the connecting members, the body of the rod and the removable bearing element or elements, are sufficiently freed to permit of such removal.

Furthermore, as compared with the usual bolt and nut construction, the present construction while being lighter, is as strong if not stronger than the old type.

An embodiment of the invention is disclosed in the annexed drawing, wherein:

Figure 1 is a plan view of a connecting rod or pitman;

Fig. 2, a side elevation thereof;

Fig. 3, a transverse sectional view taken on the line III—III of Fig. 2; and

Fig. 4, a similar view taken on the line IV—IV of the same figure.

In the drawing, the body of the rod is shown as bifurcated at one end, to provide the usual double bearing, while at the opposite end, but a single bearing is present.

Inasmuch as the means for securing the removable element of the bearing in place is the same for each bearing, the parts will be similarly numbered.

The body of the rod is denoted by 11, having its extremities, as is usual, so fashioned as to provide a semicircular face 12 against which is seated one member of the usual two-part brass or bushing 13. Said bushing is also seated in a semicircular seat 14 formed in the removable bearing element or cap piece 15.

In each of the oppositely disposed outer faces of the enlarged or head portion 16 of the body in which the face 12 is produced, there is formed a groove as 17 which stands in alignment with a similar groove 18 formed in the outer face of the removable cap piece 15.

By reason of the groove 17, shoulders or abutments 19 and 21 are formed on the head 16, while the member 14 is so contoured as to provide oppositely disposed shoulders 22 and 23. The outer portion of each of the side faces of the head 16, and likewise of the bearing member 15, are beveled as at 24 and 25, respectively, the bevels stopping short of the shoulders just mentioned.

The shrink links employed to maintain the removable bearing in place with reference to the head of the body of the rod, are alike in form throughout the structure and are similarly numbered.

The link body is numbered 26 and has heads 27 and 28 at opposite ends thereof. The length of the link is such that when in normal condition as to temperature, the heads will engage the shoulders adjacent thereto and under pressure; it being understood that the links are heated to produce an elongation thereof prior to the placement thereof in the grooves. Preferably, the laterally extending faces of the head which contact the shoulders will be given a slight outward bevel from the innermost face to the outer face, as indicated at $x$ on Fig. 2, so that more or less of a line contact is produced between the parts when the links have cooled after being positioned.

Each link is formed with a passage or opening 29 extending therethrough from end to end and the side walls of the links will be cut away intermediate the heads so as not to contact the adjacent side walls of the grooves 17 and 18. These cut away or relieved portions being out of contact with the side walls of the groove, tend to minimize the transfer of heat from the links to head 16 and member 14 when the link is heated by the introduction of a flame or a heating resistance element into the opening or passage 29. Heating the link to a temperature of the order of 600 to 800° F., expands the link to such an extent as to render it free for removal. The temperature given is essential, due to the heat transfer which necessarily takes place to a certain extent between the link and the rod.

The arrangement above described enables one to produce a rod which is considerably lighter than a rod of the usual construction employing bolts and nuts to secure the removable bearing elements in place, and designed to transfer the same load to a crank shaft under action of a piston.

Again, the relatively small size of the pitman through the bearing and the associated elements for maintaining the parts thereof in place, admits of securing a clearance between the same and the engine frame, which would not otherwise be possible.

Furthermore, owing to the lightness of the structure, the bending stresses due to inertia forces caused by oscillation of the rod are quite low; in other words, owing to lightness, the centrifugal action on the rod is not as severe as it is with a rod of the old construction above alluded to.

It will be noted that when the links are expanded so as to free the heads of the same from contact with the shouldered portions of the bearing elements or members, said links may be readily moved bodily in a lateral direction out of the grooves or channels in which they are normally seated.

The terms "connecting rod" and "pitman" are, of course, to be taken as equivalents.

What is claimed is:

1. A connecting rod, comprising in combination a body portion having a bearing portion at at least one end thereof; a detachable bearing element at said end cooperative with said bearing portion to produce a complete bearing with the bearing portion aforesaid; and shrink links, one to each side of said bearing members, said links acting upon said body portion and the detachable element and serving under normal temperature conditions to draw said portion and the detachable element together and to maintain them in such assembled relation, the bearing element and bearing portion being provided on their external edges with aligned grooves to receive said links, and said links each being provided with an opening extending therethrough, said opening affording means for the application of heat to the links whereby the links will be elongated and may be removed laterally from the body and the detachable bearing element.

2. A connecting rod, comprising in combination a body element having a bearing portion at one end; a complemental part-bearing member cooperative with said first named bearing portion to form a complete bearing, said body element and said part-bearing member having aligned grooves formed in their outer edge portions with shoulders extending laterally of the groove ends; and shrink links having heads at their ends, the body of the links when the parts are assembled lying within the grooves with the heads contacting the lateral shoulders, the side faces of the links which face the side walls of the grooves being relieved and the links having at least one passage extending longitudinally therethrough for the application of heat, whereby the links will be elongated and may be readily removed, the width of the complete bearing when the parts are assembled and measured upon a line lying within a plane extending through the axis of said bearing and at right angles to the longitudinal axis of the rod being maintained at a minimum.

RUDOLF WINTZER.